United States Patent
Blemberg et al.

(10) Patent No.: US 6,911,244 B2
(45) Date of Patent: Jun. 28, 2005

(54) ENCAPSULATED BARRIER FOR FLEXIBLE FILMS AND A METHOD OF MAKING THE SAME

(75) Inventors: Robert J. Blemberg, Appleton, WI (US); Gregory L. Petkovsek, Appleton, WI (US); Chad M. Perre, Oshkosh, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

(21) Appl. No.: 10/325,002

(22) Filed: Dec. 20, 2002

(65) Prior Publication Data

US 2003/0087057 A1 May 8, 2003

Related U.S. Application Data

(63) Continuation of application No. 09/650,385, filed on Aug. 29, 2000, now Pat. No. 6,500,514.

(51) Int. Cl.[7] ............................................... B32B 3/02
(52) U.S. Cl. ..................... 428/76; 428/520; 428/475.8; 428/910; 428/36.7
(58) Field of Search ..................... 428/910, 76, 36.7, 428/520, 475.8; 156/244.12

(56) References Cited

U.S. PATENT DOCUMENTS

| 4,526,821 | A | | 7/1985 | McHenry et al. | |
|---|---|---|---|---|---|
| 4,909,726 | A | | 3/1990 | Bekele | |
| 5,061,534 | A | | 10/1991 | Blemberg et al. | |
| 5,106,562 | A | * | 4/1992 | Blemberg et al. | ...... 264/173.13 |
| 5,374,459 | A | * | 12/1994 | Mumpower et al. | ....... 428/36.7 |
| 6,500,514 | B1 | * | 12/2002 | Blemberg et al. | ............. 428/76 |

FOREIGN PATENT DOCUMENTS

| EP | 0 323 043 | 7/1989 |
|---|---|---|
| EP | 0 473 823 | 3/1992 |

OTHER PUBLICATIONS

Supplementary European Search Report for EP Patent Application No. 01964456.6 dated May 18, 2004.

* cited by examiner

Primary Examiner—D. Lawrence Tarazano
(74) Attorney, Agent, or Firm—McDermott Will & Emery LLP

(57) ABSTRACT

The present invention relates to a film structure and a method of manufacturing the same. More specifically, the film structure may include a barrier material made from EVOH, nylon or other thermally sensitive barrier material encapsulated by a first adhesive material. The barrier material and the first adhesive material form a barrier layer and a first set of adhesive layers when coextruded. The barrier layer and the first set of adhesive layers may be coextruded at the same or a similar temperature to form a first extrudate. The extrudate may be encapsulated by or otherwise coextruded with a second adhesive material to form a second extrudate at a higher temperature than the first extrudate that then may be formed into a flat sheet via a die. The first set of adhesive layers protects the barrier layer from high temperatures and long residence times related to the coextrusion/lamination process that may degrade the barrier layer. In addition, acid terpolymer consisting of ethylene/methyl acrylate/acrylic acid adheres a barrier material of EVOH to outer layers of the film structure.

13 Claims, 2 Drawing Sheets

US 6,911,244 B2

ENCAPSULATED BARRIER FOR FLEXIBLE FILMS AND A METHOD OF MAKING THE SAME

This application is a continuation of prior application Ser. No. 09/650,385, filed Aug. 29, 2000, now U.S. Pat. No. 6,500,514.

FIELD OF THE INVENTION

The present invention relates to an encapsulated barrier film structure and a method of making the same. More specifically, the present invention relates to a thermoplastic, multilayer packaging film having a barrier layer consisting of a thermally sensitive polymer material, preferably ethylene vinyl alcohol. The material acts to prevent the passage of gases such as, for example, oxygen and/or water vapor, from one side of the film to the other. The barrier material is encapsulated by one or more layers of a relatively thermally stable material that acts to protect the barrier material from high temperatures and/or long residence times present during coextrusion, lamination or coating that may destroy or otherwise degrade the barrier material. The one or more thermally stable encapsulating layers aid in binding the thermally sensitive barrier layer to outer layers having relatively higher melt and/or extrusion temperatures thereby -maintaining optical clarity of the film produced therefrom. In addition, the present invention relates to using an acid terpolymer as an adhesive to bind the thermally sensitive barrier core material to high temperature outer layers while eliminating clarity problems associated with using other adhesives.

BACKGROUND OF THE INVENTION

It is, of course, generally known to utilize a polymeric material as a barrier material in films to prevent the passage of molecules such as, for example, gases and water vapor. Films may have these barrier properties to protect foods or other gas-sensitive materials that may be contained within bags or other containers made from the films. In particular, food articles are subject to the deleterious effects of gases and water vapors.

A known film structure that prevents the passage of molecules therethrough uses polyvinylidene chloride ("PVdC") or polyvinylidene chloride/methyl acrylate copolymer ("PVdC/MA"), commonly known as MA-Saran and manufactured by Dow Chemical Company. These barriers are generally useful in preventing molecules such as oxygen from passing therethrough but are fairly unstable at the high temperatures needed to produce many multilayer films from a molten resin. Typically, PVdC degrades at high temperatures forming polyenes reducing the optical clarity of films made therefrom. A suitable, albeit more costly, substitute for MA-Saran is ethylene vinyl alcohol copolymer ("EVOH").

Another film that is commonly used as a barrier layer, especially for food products such as cheese, is a PVdC coated oriented polypropylene ("OPP") layer. Structures made using this barrier material have good barrier characteristics. Specifically, barrier layers of PVdC coated OPP adequately restrict the movement of oxygen molecules or water vapor through packaging made therefrom. However, PVdC coated OPP is cost prohibitive.

Generally, EVOH is thermally stable at higher temperatures relative to PVdC or MA-Saran. However, EVOH is still sensitive to high temperatures, particularly when adhered to a layer of polyethylene ("PE") having maleic anhydride functional groups. While EVOH may be extruded at higher temperatures relative to PVdC, the temperature of extrusion may still be too low for coextrusion with other layers that require very high temperatures for adequate melting and/or adhesion to lamination or coating substrates.

Typical methods of coextrusion generally entail feeding the barrier material and adhesive resins into a feedblock where they are arranged into an "A/B/A" configuration prior to extrusion through a die. The adhesive layers must be compatible with the barrier layer as well as the substrates that are being laminated or coated. Further, the adhesive layers must be at or greater than 600° F. to adequately adhere to the substrates. However, this adhesive layer melt temperature requires that the downstream hardware (such as, for example, the feedblock and/or the die) be at or greater than 600° F. as well. Many barrier materials, including, especially, EVOH, readily degrade when exposed to temperatures greater than about 450° F. for extended periods of time. Due to this degradation, as well as the extensive reaction that may occur between the barrier material and the adhesive layer at the layer interface, the resulting extrudate may have clarity or other problems. For example, EVOH reacts with maleic anhydride, a typical adhesive layer used with EVOH, to produce a "ground glass" appearance when coextruded at high temperatures for extended periods of time.

A known process of coextruding and laminating heat sensitive materials is described in U.S. Pat. Nos. 5,106,562, 5,108,844, 5,190,711 and 5,236,642, which are hereby incorporated by reference in their entirety. Various methods are disclosed for reducing the impact of higher temperature polymeric meltstream elements on a lower temperature polymeric meltstream. The methods may include supercooling the hotter meltstream element below the melting temperature but above the crystallization temperature, exposing one or more meltstream elements to an undesirable thermal condition for a limited period of time, and/or using one or more layers as a heat sink via encapsulation.

Specifically, these patents describe methods of encapsulating one film layer by another material. The '562 and '844 patents specifically relate to PVdC or, preferably, PVdC-MA core materials with ethylene vinyl acetate copolymer ("EVA") or ethylene methyl acrylate copolymer ("EMA") or blend's thereof encapsulating the core material. The encapsulated PVdC or PVdC-MA is, therefore, protected from the high temperatures of the coextrusion process. Generally, the encapsulation method uses an encapsulator having a crosshead mandrel with a central bore to receive a first meltstream element from an extruder. A second polymeric meltstream is fed through a sleeve via an inlet passage into the encapsulator. As the second meltstream enters the encapsulator, it splits and flows around the first meltstream. Consequently, the second meltstream completely surrounds the first meltstream, thereby forming a combined meltstream. The second meltstream forms a continuous layer about the circumference of the first meltstream completely surrounding the first meltstream. Thus, the first and second meltstreams maintain their individual identities while the first meltstream is completely surrounded by and encapsulated within the second meltstream. The combined meltstream may then be fed through a transport pipe to a feedblock for coextrusion with one or more other layers to produce a multilayer film. However, these patents do not disclose other materials that may be utilized as heat sensitive barrier materials-besides PVdC or PVdC-MA.

SUMMARY OF THE INVENTION

The present invention relates to encapsulating a barrier material with a first adhesive layer at the same melt temperature as the barrier material. For example, EVOH melts at less than 450° F. and, therefore, is encapsulated by the first adhesive layer at less than 450° F. prior to entering the feedblock. The encapsulating first adhesive layer protects the barrier material from the hot melt temperatures of a second adhesive layer, which the first adhesive material encounters within the feedblock. The first adhesive material insulates the barrier material from the much higher melt temperature of the second adhesive layer. Moreover, the first adhesive material drastically reduces the residence time of the barrier material within the hardware by keeping it away from areas of high drag and hangup, such as the internal walls of the hardware. The result is an extrudate with excellent clarity.

It is, therefore, an advantage of the present invention to provide a film structure and a method of manufacturing the same that use a relatively inexpensive barrier material to prevent the migration of gases through the film structure such as, for example, oxygen and/or water vapor, without degrading due to high heat and/or long residence times within the film producing equipment. The encapsulated EVOH barrier layer may be utilized effectively as a replacement to cost-prohibitive barrier materials such as PVdC coated OPP.

Another advantage of the present invention is to provide a film structure and a method of manufacturing the same that allow the use of a thermally sensitive barrier material to be utilized within high temperature coextrusion/lamination processes.

And, an advantage of the present invention is to provide a film structure and a method of manufacturing the same that surround the thermally sensitive barrier material with an adhesive in an encapsulating process to protect the barrier material from high temperatures that may exist in the coextrusion/lamination process.

A still further advantage of the present invention is to provide a film structure and a method of manufacturing the same that use an adhesive to encapsulate the barrier material at the melt temperature of the barrier material. Further, the adhesive layer may protect the barrier material from layers coextruded therewith or laminated thereto having higher melt temperatures. In addition, the adhesive may protect the barrier material from high temperatures of the hardware and long residence times within the hardware.

Moreover, an advantage of the present invention is to provide a film structure and a method of manufacturing the same that uses a thermally sensitive material such as EVOH as the barrier layer material to reduce costs of the film structure.

And, another advantage of the present invention is to provide a film structure and a method of manufacturing the same that eliminates interlayer leakage and deadspots in the barrier layer material flow patterns.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention relates to a film structure and a method of manufacturing the film structure. More specifically, the present invention relates to a structure having a barrier layer to protect against the migration of molecules such as, for example, gases and/or water vapors. Generally, a first adhesive layer at a relatively low melt temperature encapsulates a thermally sensitive barrier layer. Other adhesive layers are extruded at high temperatures relative to the barrier layer and encapsulate or otherwise are coextruded with the first adhesive layer and the barrier layer. The high temperature of the second adhesive layers aid in adhering the other adhesive layers to outer substrate layers. The first adhesive layers may thereby act as both a heat sink to protect the barrier layer from the high temperatures of the coextrusion/lamination process and a tie layer to aid in bonding the thermally sensitive barrier layer to the outer substrate layers. Moreover, the present invention relates to an improved adhesive layer comprising an acid terpolymer for EVOH that may be used in any high temperature coextrusion process.

Figure 1:
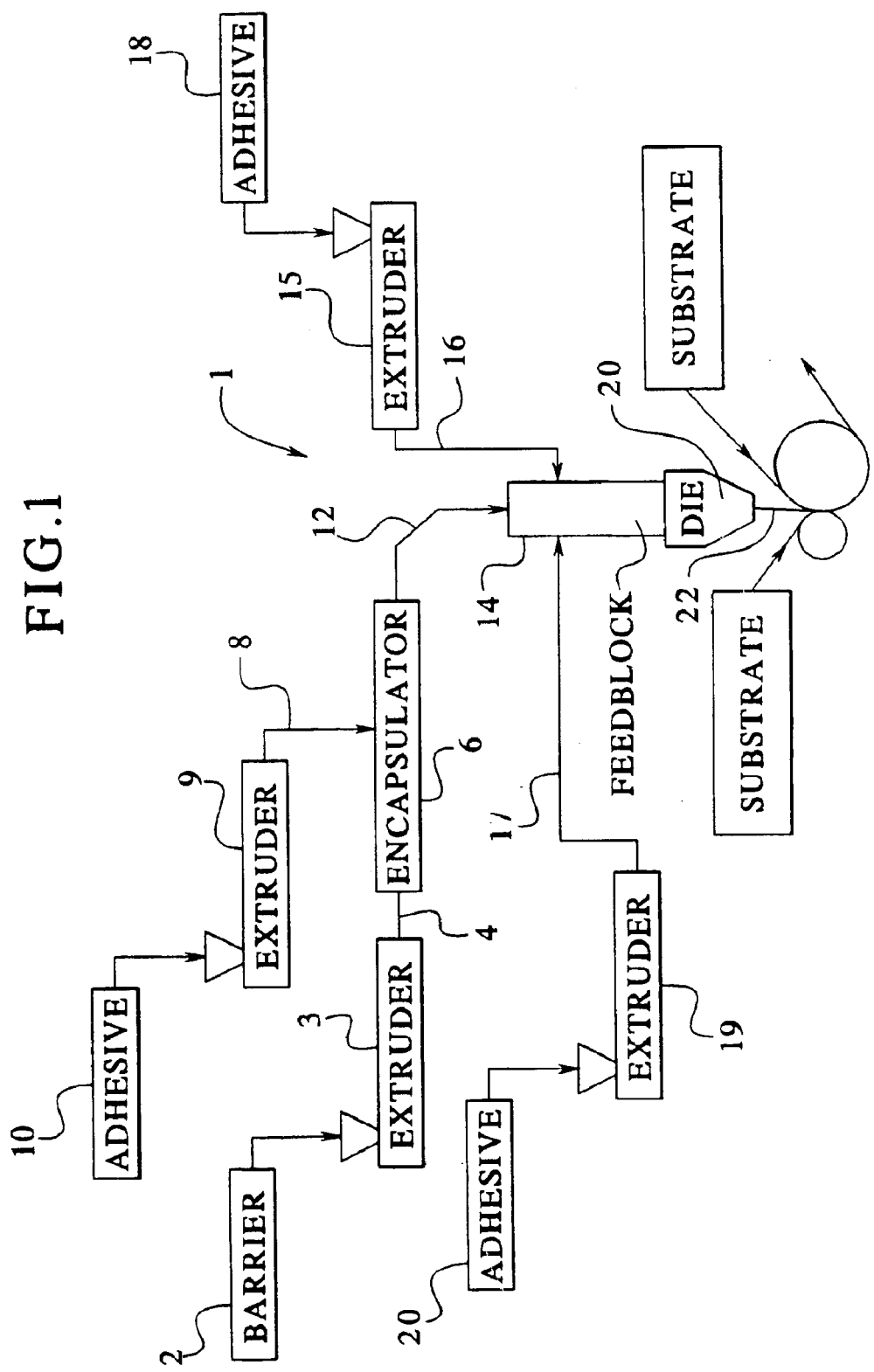
FIG. 1 illustrates an improved-coextrusion lamination process having a plurality of extruders and encapsulators in an embodiment of the present invention.

Referring now to the drawings wherein like numerals refer to like parts, FIG. 1 illustrates an encapsulation system 1. The encapsulation system 1 may include an extruder 3 that may melt and extrude a barrier material 2 into a meltstream 4 using means well known in the art. The barrier material 2 may be melted and extruded at a relatively low temperature so that the barrier material 2 does not degrade within the extruder 3. An adhesive material 10 may be extruded in a second extruder 9 to form an adhesive meltstream 8. The adhesive material 10 may be melted and extruded at a temperature that is the same or relatively similar to the melt temperature of the barrier material 2. The, meltstream 4 may then be fed into an encapsulator 6 and encapsulated by the adhesive material 10 via methods described in U.S. Pat. Nos. 5,106,562, 5,108,844, 5,190,711 and 5,236,642, each of which is incorporated in their entirety by reference. By encapsulating the thermally sensitive barrier material 2 (meltstream 4) by the adhesive material (meltstream 8), the barrier material 2 may be protected from high temperatures present within the system 1. Further, the adhesive material 10 (meltstream 8) may aid in reducing the residence time of the barrier material 2 within the downstream coextrusion hardware. The residence time is reduced because the encapsulating adhesive material 10 increases the laminar flow of the barrier material 2 through the hardware. In other words, the barrier material 2 will not get held up on the surfaces of the downstream hardware since the barrier material 2 will not contact the surfaces of the hardware.

An encapsulated meltstream 12 is thereby produced that may then be fed into a feedblock 14. The feedblock 14 may be a Cloeren® feedblock, or any other feedblock apparent to those skilled in the art. At this point, a number of different options are available to create a number of different structures. First, the encapsulated meltstream 12 may be encapsulated by a meltstream 16 from a second adhesive material 18 that is melted and extruded in a third extruder 15. Partial encapsulation may occur if the encapsulating material does not completely surround the encapsulated material. Second, the meltstream 16 and/or a meltstream 17 from a third adhesive material 20 that is melted and extruded in a fourth extruder 19, may be coextruded with the encapsulated meltstream 12 within the feedblock 14. A multilayer-coextruded sheet 22 may be formed after passing the meltstream through a die 21 to thin and spread the material into the flat sheet 22. After the sheet 22 is produced, it may be laminated with outer layers such as various substrates detailed below with reference to FIGS. 2A–2C.

Figure 2A:
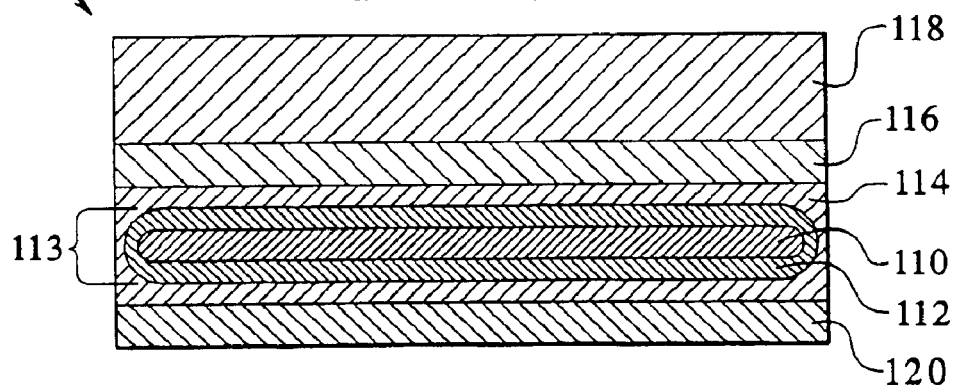
FIG. 2A shows a film structure having a barrier layer encapsulated by first adhesive layers which, in turn, are encapsulated by second adhesive layers, and then laminated outer substrates in an embodiment of the present invention.

FIG. 2A shows an improved structure 100 that may be produced by the system described above with reference to FIG. 1. The structure 100 may include a barrier layer 110 that may be completely encapsulated by first adhesive layers 112. The barrier layer 110 may be composed of any thermoplastic polymeric material that may prevent the migration of molecules such as, for example, oxygen and water vapor, thereby protecting sensitive materials contained within packages made from the structure 100. For example, the structure 100 may be utilized as a bag that may be sealed on all sides and may completely surround an article of food contained therein. The barrier layer 110 may preferably be made from a material having superior barrier properties such as, for example, polymers and/or copolymers of EVOH and EVOH blends of nylon or polyethylene. Moreover, other materials may include polyamide polymers, copolymers and blends thereof; PVdC and PVdC-MA; acrylonitrile polymers and copolymers; and polyethylene copolymers and/or blends.

The barrier layer 110 may be protected by the first adhesive layers 112 that may encapsulate the barrier layer 110 via the system described in FIG. 1. The first adhesive layers 112 may be coextruded to encapsulate the barrier layer 110 to create a first encapsulated extrudate 113 composed of a barrier layer 110 completely surrounded by first adhesive layers 112. The first extrudate 113 may then be coextruded with and/or encapsulated by second adhesive layers 114 at a higher temperature than the first encapsulated extrudate 113. The first adhesive layers 112 may protect the barrier layer 110 from the high temperatures necessary to adequately melt and extrude the second adhesive layers 114 or any other layer coextruded, laminated or otherwise disposed adjacent to the first adhesive layers 112.

Outer layers 116, 118, and/or 120 may be laminated to the first extrudate 113 as apparent to those skilled in the art. The outer layers 116, 118 and/or 120 may include any substrate necessary to add desired properties to the structure 100. For example, the outer layer 116 may include any material that may add strength, stiffness, heat resistance, durability and/or printability to the structure 100. Further, the layer 116 may act to prevent the migration of certain types of molecules, such as, for example, moisture, from penetrating into the inner layers of the structure 100. Further, the layer 116 may add flex crack resistance to the film structure produced. In addition, the outer layer 120 may be composed of a material that may act as a sealant when heated. However, it should be noted that the outer layers 116, 118 and/or 120 may be composed of any material apparent to those skilled in the art for providing desired characteristics to the structure 100.

Figure 2B:
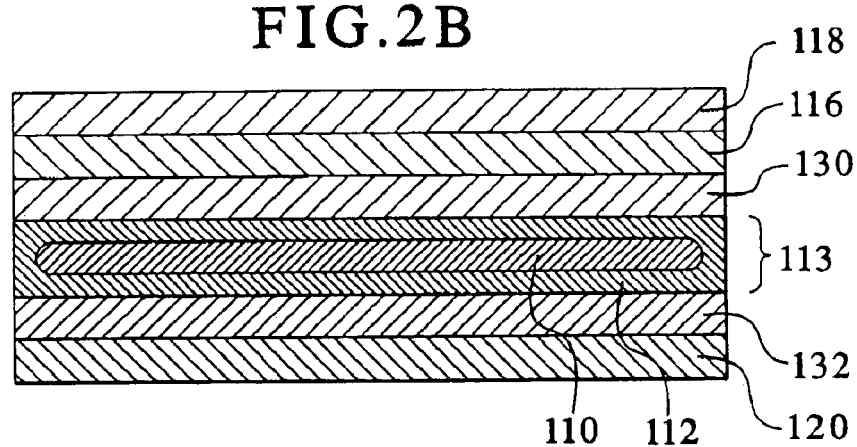
FIG. 2B illustrates a film structure having a barrier layer encapsulated by first adhesive layers and coextruded with second and third adhesive layers. Further, outer substrate layers are then laminated thereto.
Figure 2C:
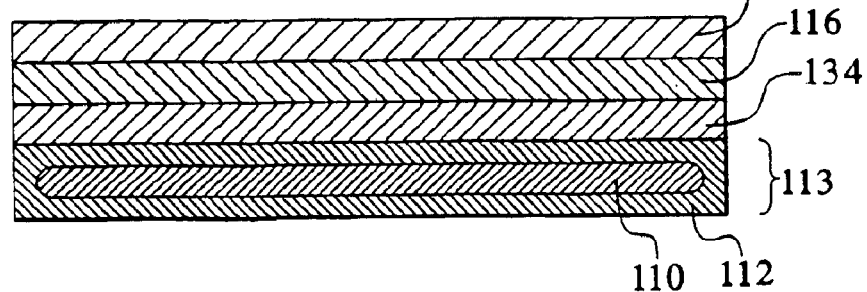
FIG. 2C illustrates an alternate embodiment of the present invention of a barrier layer encapsulated by first adhesive layers and coextruded with a single second adhesive layer on only one side of the barrier layer/first adhesive layer encapsulation. Further, outer substrate layers are then laminated thereto.

Alternatively, the first extrudate 113 may be coextruded with one or more layers as shown with reference to FIGS. 2B and 2C, rather than be encapsulated with the adhesive layers 114. Referring now to FIG. 2B, the first extrudate 113 may be coextruded with an adhesive layer 130 on a surface of the first extrudate 113. Another adhesive layer 132 may be coextruded on an opposite surface of the first extrudate 113. The adhesive layers 130, 132 may be the same material or, alternatively, may be composed of different materials. The adhesive layers 130, 132 may be different depending on the type of material bonded thereto to form the outside layers 116, 118 and/or 120. However, any type of layer may be laminated thereon as may be apparent to those skilled in the art.

Further, the first extrudate 113, including the barrier layer 110 and the first adhesive layers 112, may have an adhesive layer 134 coextruded on only one surface of the first extrudate 113 as shown in FIG. 2C. In addition, there may be no adhesive layer disposed on the opposite surface of the first extrudate 113. Further, the outer layers 116, 118 may be laminated to the adhesive layer 134.

Conventional adhesive layers coextruded, laminated or otherwise disposed adjacent to an EVOH barrier layer typically are composed of a resin of polyethylene having maleic anhydride grafted thereon. However, as stated previously, maleic anhydride tends to react with the EVOH copolymer chain causing crosslinkages between the maleic anhydride grafted polyethylene and the EVOH. Many crosslinkages may degrade the quality of the barrier layer properties and may further degrade the optical clarity of the film, causing a wavy "ground glass" appearance.

Therefore, other materials may be utilized in the present invention as adhesive layers to encapsulate, coextrude with, laminate to or otherwise be disposed adjacent to the EVOH barrier material. For example, it has been determined that an acid terpolymer of, preferably, ethylene, acrylic acid and methyl acrylate works well to tie the barrier layer of EVOH to outer layers of the film structure while protecting the EVOH barrier layer from high temperatures and long residence times within the coextrusion hardware. Moreover, acid terpolymer may be used as an adhesive layer for the following barrier layers: EVOH; EVOH/nylon blends; EVOH/polyethylene ("PE") copolymers; polyamides and acrylonitrile. Although acid terpolymer may not bind well with EVOH, this invention allows the EVOH and acid terpolymer to be subject to long residence times in order to adequately adhere to each other.

Further, polyamide, otherwise known as nylon, also may adequately bond EVOH to outer substrate layers. Polyamide adhesive layers may adhere to the following barrier layers at relatively low melt temperatures: EVOH, EVOH/nylon blends, EVOH/PE copolymers and polyamide. Moreover, acid terpolymers and nylon may provide good adhesion to EVOH without causing the optical clarity problems associated with maleic anhydride.

It should also be noted that while acid terpolymer and nylon may be used with encapsulation, as described above, they should not be limited in that regard. Specifically, acid terpolymer and nylon adhesive layers adhering to EVOH may be used in any film-making process apparent to those skilled in the art, including coextrusion and lamination processes.

Moreover, although maleic anhydride grafted to PE may cause clarity problems when used as an adhesive with EVOH, maleic anhydride may still be used, especially when clarity is not an issue. Polyethylene grafted with maleic anhydride functional groups may bond to the following barrier layers: EVOH, EVOH/nylon blends, EVOH/PE copolymers, polyamides and PVdC-MA.

Other adhesive layers that may be utilized to bond to the barrier layer and to tie the barrier layers to outer layers may include a polystyrene block copolymer, preferably for bonding to an acrylonitrile barrier layer. In addition, ethylene acrylic acid copolymer ("EAA") may be used to bond to PVdC-MA or an acrylonitrile barrier layer.

The adhesive layers 114, 130, 132 and/or 134 as shown in FIGS. 2A–2C may aid in bonding the adhesive layers 112 to substrates that may be disposed on outside surfaces of the film structure. Generally, the adhesive layers 114, 130, 132 and/or 134 may be melted and/or coextruded at relatively high temperatures since the adhesive layers 112 protect the barrier layer 110. The fact that EVOH is protected by the adhesive layers 112 allows the use of high temperatures to adequately adhere the adhesive layers 114, 130, 132 and/or 134 to the outer substrate layers.

The adhesive layers 114, 130, 132 and/or 134 may comprise any of the following: acid terpolymer; maleic anhydride grafted to polyethylene; EMA; EVA; or polystyrene block copolymer. Further, EMA may be used to tie the adhesive layers 112 to the following outer layers: oriented polyesters; oriented polypropylene; oriented nylon, metal foil; paper and paper board. Further, EVA may be used as the adhesive layers 114, 130, 132 and/or 134 to bond the adhesive layers 112 to oriented polyesters, metal foil, uniaxially oriented polypropylene or high density polyethylene ("HDPE"), paper and paper board. Finally, polyethylene such as low density polyethylene ("LDPE"), linear low density polyethylene ("LLDPE"), medium density polyethylene ("MDPE") and HDPE may be used as the adhesive layers 114, 130, 132 and/or 134 to tie the adhesive layers 112 to many other types of layers except biaxially oriented polypropylene, uniaxially oriented polypropylene or HDPE.

The barrier layer 110, adhesive layers 112, 114, 130, 132 and/or 134 may be laminated to substrates to form completed film structures. As noted with reference to FIGS. 2A and 2B, the substrates may include the outer layers 116, 118 and/or 120. The substrates may be composed of any of the following materials: oriented polyesters and variations thereof including metallized polyesters; oriented polypropylene and variations thereof including metallized PP; biaxially oriented nylon; metal foil; uniaxially oriented PP or HDPE; paper and paper board; non-oriented nylon or EVOH/nylon blends, including metallized variations thereof; extrusion coated PET/nylon; single site catalyzed ("SSC") polyolefins and ionomers. It should be noted that the list of substrates above is not exhaustive; any polymeric material may be used as a substrate for any purpose as may be apparent to those skilled in the art. The following table lists common substrates with materials commonly used as adhesives. Further, the table lists the melt temperatures necessary to adequately adhere the adhesive materials to the substrates:

CONDITIONS FOR ADEQUATE ADHESION TO VARIOUS SUBSTRATES

| Substrate Type | Adhesive Material (Melt Temperature) |
| --- | --- |
| PET | PE (610° F.), EMA (610° F.) |
| Oriented Polypropylene | EMA (550° F.) |
| Foil | Acid Copolymer (550° F.), Ionomer (610° F.), PE (610° F.) |
| Paper | EVA (550° F.), PE (550° F.), Ionomer (550° F.) |
| Cellophane | EVA (550° F.), PE (610° F.) |
| PVDC | EVA (550° F.), PE (610° F.) |

CONDITIONS FOR ADEQUATE ADHESION TO VARIOUS SUBSTRATES -continued

| Substrate Type | Adhesive Material (Melt Temperature) |
| --- | --- |
| Biaxially oriented nylon | Acid Copolymer (550° F.), Ionomer (610° F.), PE (610° F.) |

Preferred Film Structures

STRUCTURE 1

| Layer | Components | Melt Temperature |
| --- | --- | --- |
| Outer Layer 118 | EVA | NA |
| Outer Layer 116 | oriented polypropylene | NA |
| Adhesive 114, 130 | EMA, PE or other PE copolymers | 550–610° F. |
| Adhesive 112 | acid terpolymer or maleic anhydride grafted to PE | 400–450° F. |
| Barrier 110 | EVOH or EVOH blend | 400–450° F. |
| Adhesive 112 | acid terpolymer or maleic anhydride grafted to PE | 400–450° F. |
| Adhesive 114, 132 | EMA, PE or other PE copolymers | ~610° F. |
| Outer Layer 120 | Polyester | NA |

As shown in Structure 1 and corresponding to the film structure shown in FIG. 2A or 2B, EVOH or an EVOH blend (>75% EVOH) may be used as the barrier layer 110 with acid terpolymer or maleic anhydride grafted to PE as the adhesive layers 112 encapsulating the EVOH barrier layer 110. In a preferred embodiment, the EVOH barrier layer may be encapsulated by acid terpolymer forming the first extrudate 113 at a first temperature that is relatively low since both the EVOH and acid terpolymer will extrude within the same temperature range of 400° F. and 450° F. preferably 410° F. Next, PE copolymers or blends thereof may be coextruded with the first extrudate 113 of EVOH and acid terpolymer or maleic anhydride to make a film structure corresponding to the film structure of FIG. 2B. Alternatively, the first extrudate 113 may be fed through a second encapsulator thereby encapsulating the first extrudate by the PE copolymer such as, for example, EMA, thereby making a film structure corresponding to the film structure of FIG. 2A.

Preferably, the adhesive layers 114, 130 are EMA. To adequately adhere the EMA to the oriented polypropylene layer, as shown in Structure 1, the EMA should be extruded at a temperature of about 550° F. Moreover, the adhesive layers 114, 132 bonded to the outer layer 120 of PET should be extruded at a temperature of about 610° F. to adequately adhere to the PET. As previously noted, the adhesive layers 112 protect the EVOH barrier layer from the high temperatures or long residence times of the encapsulation or coextrusion of the adhesive layers 114, 130 and/or 132.

STRUCTURE 2

| Layer | Components | Melt Temperature |
| --- | --- | --- |
| Outer Layer 118 | EVA | NA |
| Outer Layer 116 | OPP or biaxially oriented nylon | NA |
| Adhesive 114, 130 | LDPE, EMA or other PE copolymers (with or without maleic anhydride functionality) | 550–610° F. |

-continued

STRUCTURE 2

| Layer | Components | Melt Temperature |
|---|---|---|
| Adhesive 112 | Nylon | 440–470° F. |
| Barrier 110 | EVOH or EVOH blend | 400–450° F. |
| Adhesive 112 | Nylon | 440–470° F. |
| Adhesive 114, 132 | LDPE, EMA or other PE copolymers (with or without maleic anhydride functionality) | ~610° F. |
| Outer Layer 120 | PET or other | NA |

As shown in Structure 2 and corresponding to the film structure shown in FIG. 2A or 2B, EVOH or an EVOH blend (>75% EVOH) may be used as the barrier layer 110 with nylon as the adhesive layers 112 encapsulating the EVOH barrier layer 110. The EVOH barrier layer may be extruded within a temperature range of 400° F. and 450° F. preferably 410° F. and may be encapsulated by nylon that may be extruded within the temperature range of 440° F. and 470° F. preferably 450° F. Next, the adhesive layers 114, 130 and/or 132 comprising a layer of LDPE or EMA may encapsulate or otherwise be coextruded with the first extrudate 113 of EVOH and nylon to make a film structure corresponding to the film structure of FIG. 2A or 2B. To adequately adhere the LDPE or EMA to the oriented polypropylene layer, as shown in Structure 2, the LDPE or EMA should be extruded at a temperature of about 550° F. Moreover, the adhesive layers 114, 132 comprising LDPE or EMA bonded to the outer layer 120 of PET should be extruded at a temperature of about 610° F. to adequately adhere to the PET. As previously noted, the adhesive layers 112 protect the EVOH barrier layer from the high temperatures or long residence times of the encapsulation or coextrusion of the adhesive layers 114, 130 and/or 132.

STRUCTURE 3

| Layer | Components | Melt Temperature |
|---|---|---|
| Outer Layer 118 | EVA or other | NA |
| Adhesive 114, 130 | LDPE | 580–620° F. |
| Adhesive 112 | Acid Terpolymer | 400–450° F. |
| Barrier 110 | EVOH | 400–450° F. |
| Adhesive 112 | Acid Terpolymer | 400–450° F. |
| Adhesive 114, 132 | LDPE | ~610° F. |
| Outer Layer 120 | PET or other | NA |

Structure 3 may correspond to the film structure of FIG. 2B, except without the outer layer 116. In other words, Structure 3 may have a barrier layer 110 of EVOH encapsulated by the adhesive layers 112 comprising, preferably, acid terpolymer. Again, the EVOH and the acid terpolymer may be extruded between 400° F. and 450° F. Adhesive layers 114, 130 and/or 132 may encapsulate or otherwise be coextruded with the first extrudate 113 comprising EVOH and acid terpolymer. The adhesive layers 114, 130 bonding to outer layer 118 comprising EVA may be extruded at a temperature between 580° F. and 620° F. The adhesive layers 114, 132 that bond to the outer layer 120 comprising PET may be extruded at a temperature of about 610° F. The elimination of the OPP layers allows for the use of LDPE as the adhesive layer 114 or 130.

STRUCTURE 4

| Layer | Components | Melt Temperature |
|---|---|---|
| Outer Layer 118 | EVA or other | NA |
| Outer Layer 116 | OPP or biaxially oriented nylon | NA |
| Adhesive 114, 130 | PE with grafted maleic anhydride | 580–620° F. |
| Adhesive 112 | Nylon | 440–470° F. |
| Barrier 110 | EVOH or EVOH/nylon blend | 400–450° F. |
| Adhesive 112 | Nylon | 440–470° F. |
| Adhesive 114, 132 | PE with grafted maleic anhydride | ~610° F. |
| Outer Layer 120 | PET or biaxially oriented nylon | NA |

Structure 4 illustrates another preferred embodiment of the present invention. In this embodiment, the barrier layer 110 may be EVOH or EVOH blended with nylon having adhesive 112 comprising nylon encapsulating the barrier layer 110. Again, the barrier layer 110 and the first adhesive layers 112 may be extruded and encapsulated at roughly the same temperature to protect the barrier layer from degradation caused by heat or long residence times. Further, the adhesive layers 114, 130 and/or 132 may comprise polyethylene blended with polyethylene having maleic anhydride functional groups grafted thereto and may encapsulate the barrier layer and the first adhesive layers or may otherwise be coextruded therewith. The adhesive layers 114, 130 and/or 132 may be extruded at a relatively high temperature compared to the barrier layer and the adhesive layers 112: about 580° F. to about 620° F. The outer layer 116 may comprise an oriented polypropylene layer or a layer of nylon disposed between the adhesive layer 114 or 130 and the outer layer 118 may comprise a sealant layer of EVA or other material. Further, the outer layer 120 may be PET or biaxially oriented nylon. Another embodiment may have no outer layer 116 disposed between the adhesive 114 or 130 and the outer layer 118.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A film structure comprising:
    a barrier layer made from a thermally sensitive material;
    a first adhesive material wherein the thermally sensitive material is encapsulated by the first adhesive material forming a first extrudate upon coextrusion of the thermally sensitive material and the first adhesive material at a first temperature wherein the first adhesive material forms first and second adhesive layers on opposite sides of the barrier layer;
    a second adhesive material adhered to the first extrudate on a surface of the first extrudate wherein the second adhesive material forms a third adhesive layer on at least one outside surface of the first adhesive material wherein the second adhesive material is coextruded with the first extrudate at a second temperature to form a second extrudate wherein the second temperature is higher than the first temperature; and
    at least one substrate laminated to an outside surface of the second extrudate at a temperature higher than the first temperature wherein said substrate comprises oriented polypropylene.

2. The film structure of claim 1 further comprising:
a sealant layer laminated to the polypropylene layer; and
an outer layer laminated to another outside surface of the second extrudate.

3. A method of manufacturing a film structure, the method comprising the steps of:
providing a first extruder for extruding a thermally sensitive barrier material;
extruding said barrier material;
providing a second extruder for extruding a first adhesive material;
extruding the first adhesive material;
encapsulating the barrier material by the first adhesive material in a first encapsulator to form a first extrudate at a first temperature;
providing a second adhesive material;
extruding the second adhesive material via a third extruder;
adhering the first extrudate to the second adhesive at a second temperature to form a combined meltstream wherein the second temperature is higher than the first temperature;
feeding the combined meltstream through a die to form a flat sheet wherein the flat sheet includes a barrier layer encapsulated by first adhesive layers on opposite sides of the barrier layer and further wherein at least one of the first adhesive layers are bonded to a second adhesive layer on an outside surface of the first adhesive layers; and
laminating said sheet to at least one substrate at a temperature higher than the first temperature wherein said substrate comprises an oriented polypropylene layer.

4. A film structure comprising:
a thermally sensitive barrier layer made from a first polymeric material comprising ethylene vinyl alcohol copolymer wherein said first polymeric material has a melt temperature range between about 400° F. and about 450° F.;
first and second adhesive layers disposed on opposite surfaces of the barrier layer wherein the first and second adhesive layers are made from a second polymeric material having a melt temperature between about 400° F. and about 450° F. wherein said first and second adhesive layers are formed by encapsulating said barrier layer with said second polymeric material;
a third adhesive layer on an outside surface of the first adhesive layer having a melt temperature between about 550° F. and about 620° F. wherein said barrier layer and first, second and third adhesive layers are coextruded together to form an extrudate; and
at least one substrate laminated to said extrudate, wherein said substrate comprises oriented polypropylene and further wherein the film structure comprises a sealant layer forming a first outside layer of the film structure disposed adjacent to the polypropylene layer and a second outside layer of the film structure disposed on an opposite side of the film structure from the sealant layer.

5. The film structure of claim 4 wherein the second outside layer comprises a material selected from the group consisting of polyester, oriented polypropylene, biaxially oriented nylon, paper, polyvinylidene chloride copolymer coated substrates, metallized substrates and glass coated substrates.

6. A film structure comprising:
a thermally sensitive barrier layer made from a first polymeric material comprising ethylene vinyl alcohol copolymer wherein said first polymeric material has a melt temperature range between about 400° F. and about 450° F.;
first and second adhesive layers disposed on opposite surfaces of the barrier layer wherein the first and second adhesive layers are made from a second polymeric material having a melt temperature between about 400° F. and about 450° F. wherein said first and second adhesive layers are formed by encapsulating said barrier layer with said second polymeric material;
a third adhesive layer on an outside surface of the first adhesive layer having a melt temperature between about 550° F. and about 620° F. wherein said barrier layer and first, second and third adhesive layers are coextruded together to form an extrudate;
at least one substrate laminated to said extrudate;
a sealant layer forming an outside layer of the film structure disposed adjacent to an outside surface of the substrate; and
an outside layer of the film structure disposed on an opposite side of the film structure from the sealant layer, wherein the outside layer comprises a material selected from the group consisting of polyester, oriented polypropylene, biaxially oriented nylon, paper, polyvinylidene chloride copolymer coated substrates, metallized substrates and glass coated substrates.

7. A film structure comprising:
a barrier layer made from a thermally sensitive material comprising ethylene vinyl alcohol copolymer;
a first adhesive material wherein the thermally sensitive material is encapsulated by the first adhesive material forming a first extrudate upon coextrusion of the thermally sensitive material and the first adhesive material at a first temperature wherein the first adhesive material forms first and second adhesive layers on opposite sides of the barrier layer;
a second adhesive material adhered to the first extrudate on a surface of the first extrudate wherein the second adhesive material forms a third adhesive layer on at least one outside surface of the first adhesive material wherein the second adhesive material is coextruded with the first extrudate at a second temperature to form a second extrudate wherein the second temperature is higher than the first temperature; and
at least one substrate laminated to an outside surface of the second extrudate wherein said substrate comprises oriented polypropylene and further wherein said film structure comprises a sealant layer laminated to the polypropylene and an outer layer laminated to another outside surface of the second extrudate.

8. A method of manufacturing a film structure, the method comprising the steps of:
providing a first extruder for extruding a thermally sensitive barrier material comprising ethylene vinyl alcohol copolymer;
extruding said barrier material;
providing a second extruder for extruding a first adhesive material;
extruding the first adhesive material;
encapsulating the barrier material by the first adhesive material in a first encapsulator to form a first extrudate at a first temperature;
providing a second adhesive material;
extruding the second adhesive material via a third extruder;
adhering the first extrudate to the second adhesive at a second temperature to form a combined meltstream wherein the second temperature is higher than the first temperature;

feeding the combined meltstream through a die to form a flat sheet wherein the flat sheet includes a barrier layer encapsulated by first adhesive layers on opposite sides of the barrier layer and further wherein at least one of the first adhesive layers are bonded to a second adhesive layer on an outside surface of the first adhesive layers; and laminating said sheet to at least one substrate wherein said substrate comprises an oriented polypropylene layer.

9. The film structure comprising:

a thermally sensitive barrier layer made from a first polymeric material comprising ethylene vinyl alcohol copolymer wherein said first polymeric material has a melt temperature range between about 400° F. and about 450° F. ;

first and second adhesive layers disposed on opposite surfaces of the barrier layer wherein the first and second adhesive layers are made from a second polymeric material having a melt temperature between about 400° F. and about 450° F. wherein said first and second adhesive layers are formed by encapsulating said barrier layer with said second polymeric material;

a third adhesive layer on an outside surface of the first adhesive layer having a melt temperature between about 550° F. and about 620° F. wherein said barrier layer and first, second and third adhesive layers are coextruded together to form an extrudate; and at least one substrate layer formed separately from and adhered to said extrudate wherein said substrate comprises oriented polypropylene and further wherein the film structure comprises:

a sealant layer forming a first outside layer of the film structure disposed adjacent to the polypropylene layer; and a second outside layer of the film structure disposed on an opposite side of the film structure from the sealant layer.

10. The film structure of claim 9, wherein the outside layer comprises a material selected from the group consisting of polyester, oriented polypropylene, biaxially oriented nylon, paper, polyvinylidene chloride copolymer coated substrates, metallized substrates and glass coated substrates.

11. The film structure comprising:

a thermally sensitive barrier layer made from a first polymeric material comprising ethylene vinyl alcohol copolymer wherein said first polymeric material has a melt temperature range between about 400° F. and about 450° F. ;

first and second adhesive layers disposed on opposite surfaces of the barrier layer wherein the first and second adhesive layers are made from a second polymeric material having a melt temperature between about 400° F. and about 450° F. wherein said first and second adhesive layers are formed by encapsulating said barrier layer with said second polymeric material;

a third adhesive layer on an outside surface of the first adhesive layer having a melt temperature between about 550° F. and about 620° F. wherein said barrier layer and first, second and third adhesive layers are coextruded together to form an extrudate; and at least one substrate layer formed separately from and adhered to said extrudate further comprising:

a sealant layer forming an outside layer of the film structure disposed adjacent to an outside surface of the substrate; and an outside layer of the film structure disposed on an opposite side of the film structure from the sealant layer wherein the outside layer comprises a material selected from the group consisting of polyester, oriented polypropylene, biaxially oriented nylon, paper, polyvinylidene chloride copolymer coated substrates, metallized substrates and glass coated substrates.

12. The film structure comprising:

a barrier layer made from a thermally sensitive material comprising ethylene vinyl alcohol copolymer;

a first adhesive material wherein the thermally sensitive material is encapsulated by the first adhesive material forming a first extrudate upon coextrusion of the thermally sensitive material and the first adhesive material at a first temperature wherein the first adhesive material forms first and second adhesive layers on opposite sides of the barrier layer;

a second adhesive material adhered to the first extrudate on a surface of the first extrudate wherein the second adhesive material forms a third adhesive layer on at least one outside surface of the first adhesive material wherein the second adhesive material is coextruded with the first extrudate at a second temperature to form a second extrudate wherein the second temperature is higher than the first temperature; and at least one substrate formed separately from and adhered to an outside surface of the second extrudate;

wherein said substrate comprises oriented polypropylene and further wherein said film structure comprises:

a sealant layer laminated to the polypropylene layer, and an outer layer laminated to another outside surface of the second extrudate.

13. A method of manufacturing a film structure, the method comprising the steps of:

providing a first extruder for extruding a thermally sensitive barrier material comprising ethylene vinyl alcohol copolymer;

extruding said barrier material;

providing a second extruder for extruding a first adhesive material;

extruding the first adhesive material;

encapsulating the barrier material by the first adhesive material in a first encapsulator to form a first extrudate at a first temperature;

providing a second adhesive material;

extruding the second adhesive material via a third extruder;

adhering the first extrudate to the second adhesive at a second temperature to form a combined meltstream wherein the second temperature is higher than the first temperature;

feeding the combined meltstream through a die to form a flat sheet wherein the flat sheet includes a barrier layer encapsulated by first adhesive layers on opposite sides of the layer and further wherein at least one of the first adhesive layers are bonded to a second adhesive layer on an outside surface of the first adhesive layers; and laminating said sheet to at least one substrate formed separately from said sheet herein said substrate comprises an oriented polypropylene layer.

* * * * *